United States Patent [19]

Lin

[11] Patent Number: 5,704,698
[45] Date of Patent: Jan. 6, 1998

[54] KEYBOARD SLIDE STRUCTURE WITH REMOVABLE PALM REST AND SLIDE RAIL MEANS

[76] Inventor: Chin-Chih Lin, 2F, No. 160, Shih Ta Road, Taipei, Taiwan

[21] Appl. No.: 598,002

[22] Filed: Feb. 7, 1996

[51] Int. Cl.[6] .................................................. A47B 46/00
[52] U.S. Cl. ........................ 312/208.1; 312/223.3; 312/334.12; 312/334.21; 312/334.45; 248/918; 248/118
[58] Field of Search ....................... 312/208.1, 223.1, 312/223.3, 330.1, 282, 246, 334.12, 334.8, 334.21, 334.23, 334.26, 334.44, 334.45, 334.46; 400/715, 682; 248/918, 118.3, 118, 118.1; 108/143, 65, 69, 90, 50, 25, 26

[56] References Cited

U.S. PATENT DOCUMENTS

| | | | |
|---|---|---|---|
| 834,595 | 10/1906 | Wadsworth | 312/334.26 X |
| 2,306,209 | 12/1942 | Elofson et al. | 312/223.2 |
| 2,912,293 | 11/1959 | Jung | 312/246 X |
| 2,923,583 | 2/1960 | Viehmann | 312/246 |
| 3,746,418 | 7/1973 | Barber, Jr. | 312/334.45 |
| 4,717,112 | 1/1988 | Pirkle | 248/918 X |
| 4,736,689 | 4/1988 | Stanko | 108/143 X |
| 4,913,390 | 4/1990 | Berke | 248/118.3 X |
| 5,074,511 | 12/1991 | Wilson | 248/918 X |
| 5,158,256 | 10/1992 | Gross | 400/715 X |
| 5,351,897 | 10/1994 | Martin | 248/918 X |
| 5,375,800 | 12/1994 | Wilcox et al. | 248/118.1 |
| 5,443,237 | 8/1995 | Stadtmauer | 248/918 X |
| 5,533,697 | 7/1996 | Fletcher et al. | 248/918 X |
| 5,542,637 | 8/1996 | Schriner | 248/918 X |
| 5,547,154 | 8/1996 | Kirchhoff et al. | 248/918 X |

FOREIGN PATENT DOCUMENTS 2447215  4/1976  Germany .......................... 312/351

*Primary Examiner*—Peter M. Cuomo
*Assistant Examiner*—Janet M. Wilkens
*Attorney, Agent, or Firm*—Bacon & Thomas

[57] ABSTRACT

A keyboard slide structure which includes a keyboard slide having a top side provided with multiple holes at a front edge thereof, a palm rest removably locked to the holes of the keyboard slide by snap hooks thereof. A sliding mouse pad may be slidably connected to either the left or the right side of the keyboard slide by means of a slide rail means such that the mouse slide may be slid out or in under the keyboard slide in a retractable manner.

18 Claims, 5 Drawing Sheets

KEYBOARD SLIDE STRUCTURE WITH REMOVABLE PALM REST AND SLIDE RAIL MEANS

BACKGROUND OF THE INVENTION (a) Field of the Invention

The present invention relates generally to a keyboard slide structure, and more particularly to a keyboard slide having a removable palm rest and provided with a sliding mouse pad and slide rail means.

(b) Description of the Prior Art

Existing computer desks are generally provided with a keyboard slide on which the keyboard may be placed. For computer users who have to key in for prolonged periods of time, the hands will easily feel tired and, worse still, the hand joints may be hurt. As a result, multimedia keyboards with palm rests are developed. However, this kind of multimedia keyboards are space-occupying and not collapsible. Besides, they are costly to manufacture. Therefore, standard computer keyboards are more popular. Improvements on the existing art are therefore necessary.

Furthermore, in known computer desks, there is not a particular space particularly designed for the mouse, digitizer or the like so that such items are often scatteredly placed on the computer desks, which is very untidy.

SUMMARY OF THE INVENTION

Accordingly, a primary object of the present invention is to provide a keyboard slide structure with a removable palm rest to eliminate the drawbacks in the prior art.

A further object of the present invention is to provide a slide rail means for connecting a keyboard with a sliding mouse pad.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
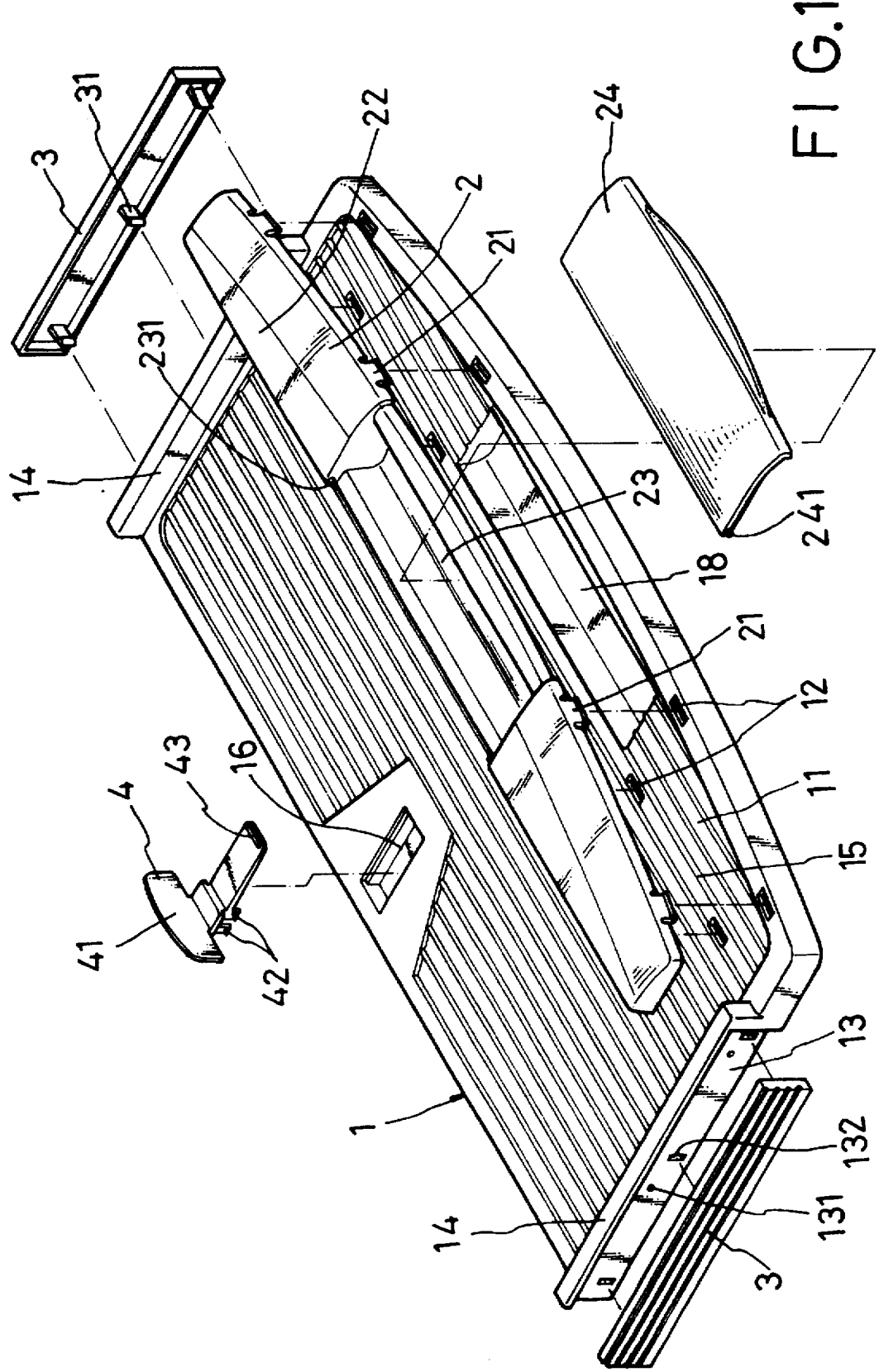
FIG. 1 is an elevational exploded view of a keyboard slide of the present invention.

With reference to the drawings, the slide keyboard structure according to the present invention essentially comprises a keyboard slide 1, a palm rest means 2, two side plates 3, an adjusting element 4, a sliding mouse pad 5 and a slide rail means 6.

Figure 3:
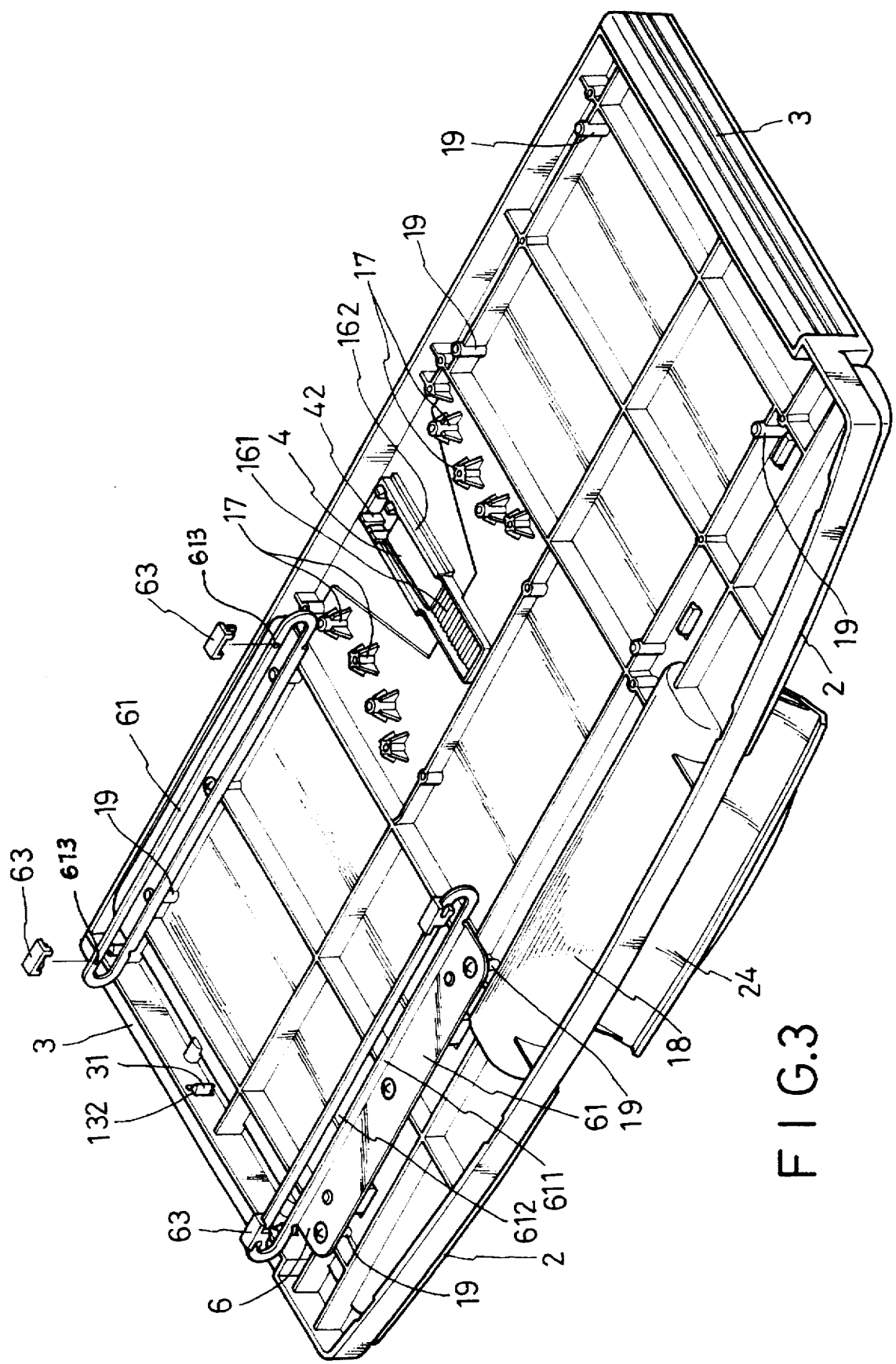
FIG. 3 is a schematic bottom view of the keyboard slide of the invention.

As shown in FIG. 1, the keyboard slide 1 is a planar structure having a top side 11 provided with a plurality of holes 12 at a front edge thereof for insertable connection with the palm rest means 2 and two lateral indentations 13 having a plurality of locking holes 131 for fastening with a conventional slide rail means before the keyboard slide 1 is secured to a computer desk in a retractable manner. The lateral indentations 13 are respectively provided with a plurality of fastening slots 132 for fastening of the side plates 3 thereto. Two raised portions 14 are further provided on both lateral sides of the keyboard slide 1 to serve as limits for a keyboard placed on the keyboard slide 1. And in order to prevent the keyboard from displacing on the top side 11 of the keyboard slide 1, a plurality of equally spaced apart horizontal surface ribs 15 are formed on the top side 11. Besides, an adjusting hole 16 is provided at a central rear portion of the top side 11 for preventing the keyboard from displacing to the rear. As shown in FIG. 3, the adjusting hole 16 has a bottom side thereof provided with a plurality of corrugated teeth 161 at a front portion. The adjusting hole 16 is further provided with two side flanges 162 for connection with the adjusting element 4 so that the adjusting element 4 may displace forwardly or backwardly therein. If it is not desired to use the above-mentioned conventional slide rail means and it is desired to use a retractable rod, the bottom side of the keyboard slide 1 may be provided with a plurality of symmetrical locking posts 17 respectively having holes for lockable connection therewith. In addition, the indentations 13 may be secured with the side plates 3 respectively by means of the fastening slots 132 to achieve a pleasing appearance.

Furthermore, a depression 18 is provided at a central front portion of the top side 11 of the keyboard slide 1 to allow users to place small items like pens and pencils therein.

The palm rest means 2 comprises an elongated curved palm rest 22, a plurality of snap hooks 21 at the front side of the palm rest 22 for fitting into the holes 12 of the keyboard slide 1. A recess 23 is made at the top side of the palm rest 22 in the middle for users to place small items therein as well. Two lugs 231 are disposed at a rear edge of the recess 23 so that a cover 24 having two holes 241 at a front edge thereof may be positioned in place on the recess 23 such that the cover 24 may be opened or closed. The palm rest 22 may be respectively provided with a soft pad to provide comfort to the user.

In actual use, if the the palm rest 22 is not fastened to the top side 11 of the keyboard 1, a multimedia keyboard with palm rest means may be placed thereon. And when the palm rest 22 is positioned in place, the top side 11 may support a standard keyboard.

The side plates 3 have a size corresponding to the size of the indentations 13 respectively. Each side plate 3 has a plurality of lugs 31 for fitting into the fastening slots 132 so that, after the side plates 3 are positioned in place, the upper sides thereof align with the upper sides of the raised portions 14 on both lateral sides of the top side 11 of the keyboard slide 1.

Figure 2:
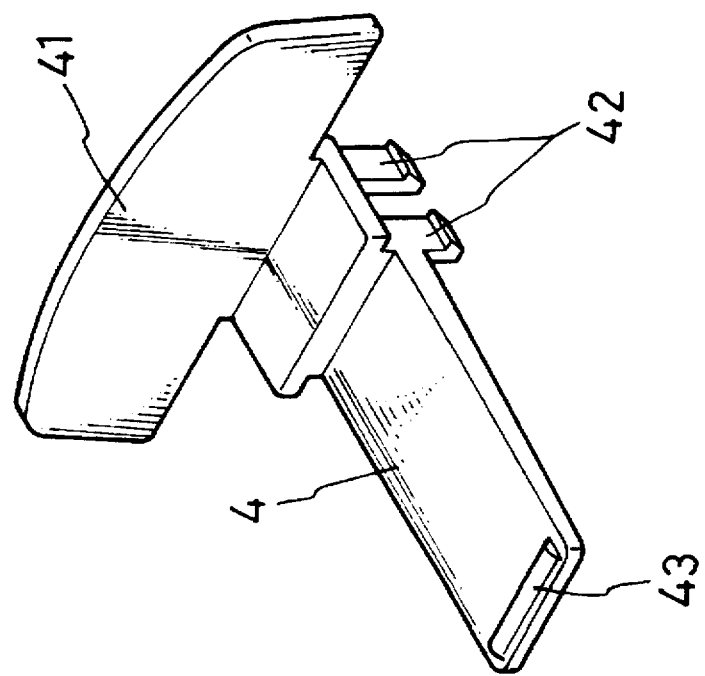
FIG. 2 is an elevational view of an adjusting element of the invention.

With reference to FIG. 2, the adjusting element 4 is a substantially L-shaped plate having a size matching that of the adjusting hole 16 so that it may fit thereinto. The adjusting element 4 has a stop piece 41 at a rear end thereof which is larger than the adjusting hole 16 and may abut a rear side of the keyboard. At least one snap hook 42 is provided to extend from a lower portion of the adjusting element 4 for engaging the side flanges 162 of the adjusting hole 16 so that the adjusting element 4 may displace within the adjusting hole 16. Besides, a raised portion 43 is provided at a front end of the adjusting element 14 for engaging the teeth 161 of the adjusting hole 16 for positioning purposes.

Furthermore, the sliding mouse pad 5 may be arranged at one of the lateral sides of the keyboard slide 1 by means of the slide rail means 6 connecting the sliding mouse pad 5 to the bottom side of the keyboard slide 1 so that the sliding mouse pad 5 may operate in a retractable manner. A mouse, digitizer, glide-point or the like may be placed on the sliding mouse pad as desired.

Figure 5:
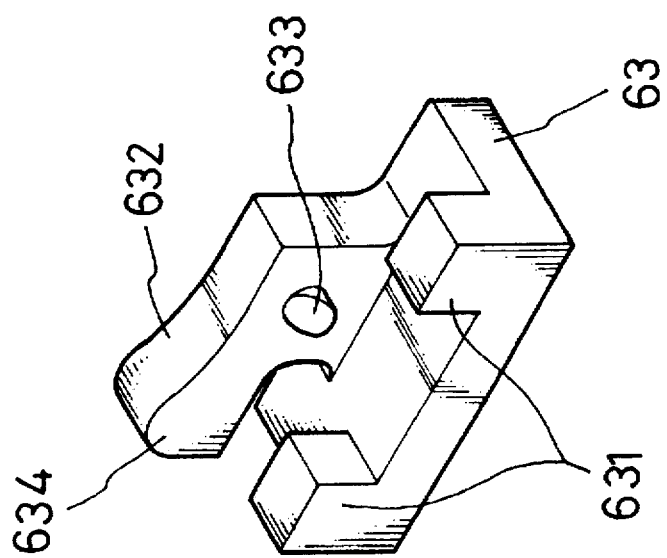
FIG. 5 is an elevational view of a stop piece of the invention.
Figure 4:
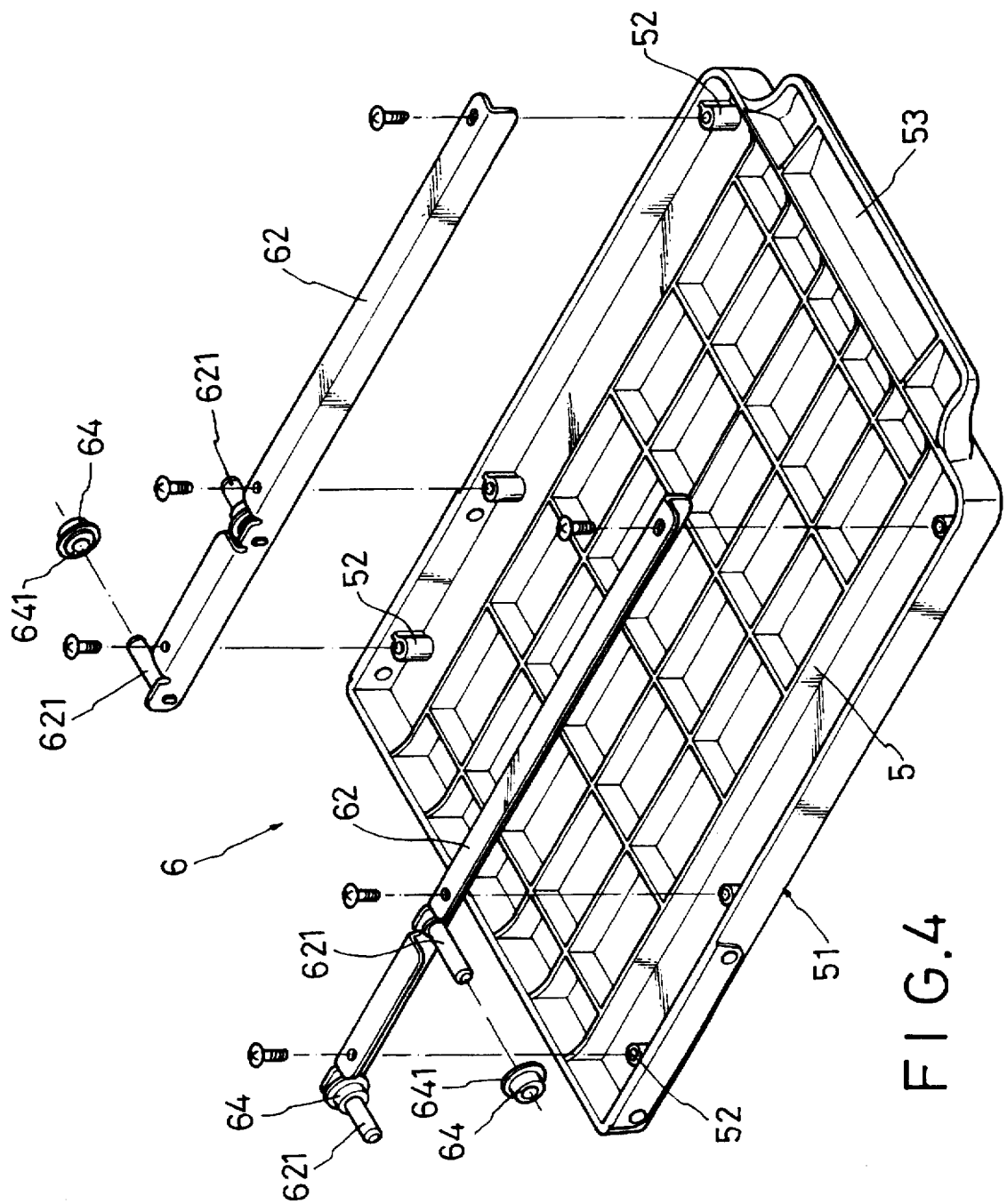
FIG. 4 is a schematic elevational exploded view of a sliding mouse pad of the invention.
Figure 6:
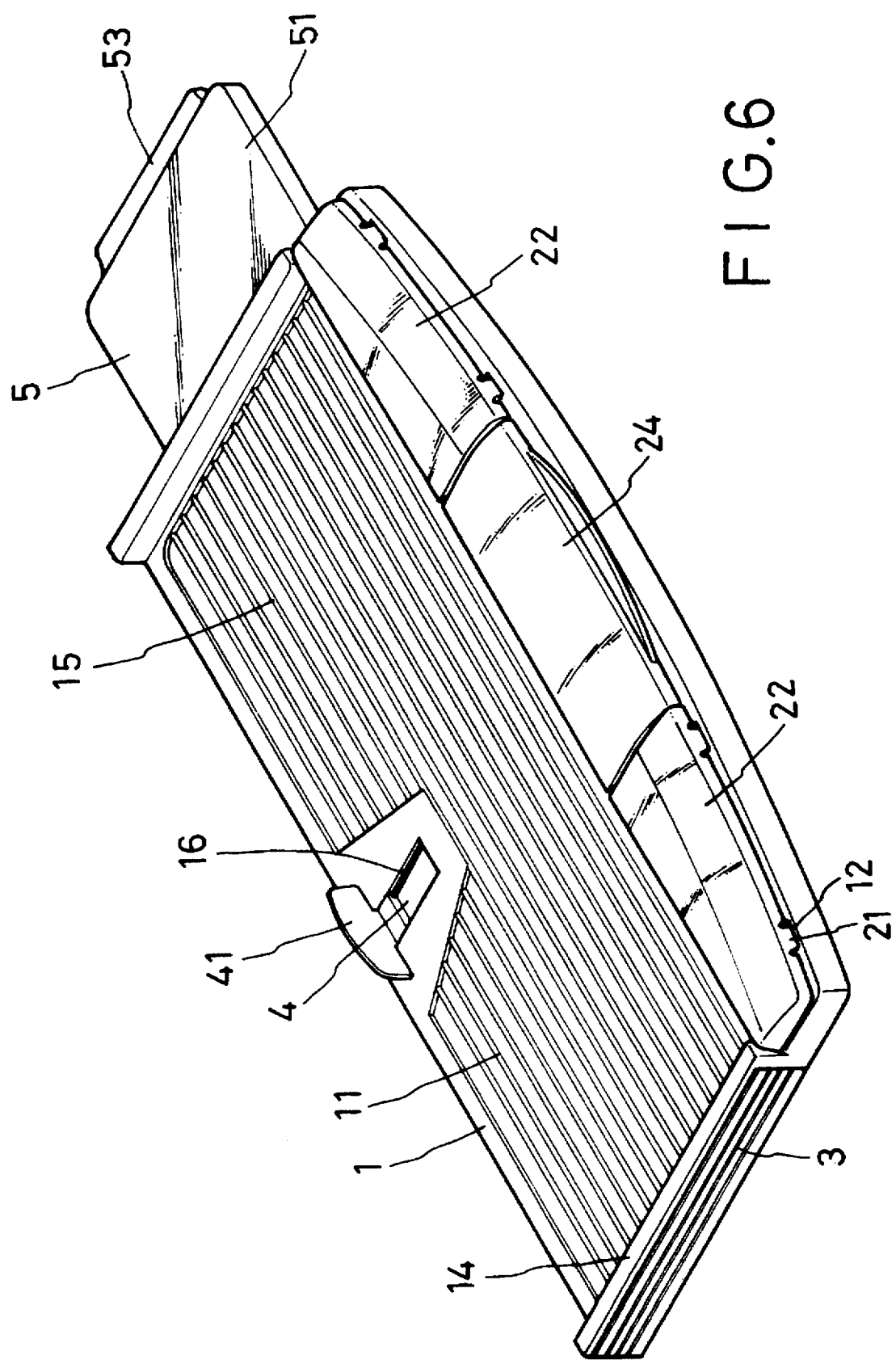
FIG. 6 is a schematic elevational view of the keyboard slide with the sliding mouse pad of the invention in an assembled state.

With reference to FIGS. 3 to 5, the bottom side of the keyboard slide 1 is provided with a plurality of hollow posts 19 at the front and rear edges thereof for connection with the slide rail means 6.

The sliding mouse pad 5 is a substantially planar plate of a suitable size so that it may be placed between the two hollow posts near one of the lateral sides of the bottom side of the keyboard slide 1. The sliding mouse pad 5 has an upper surface 51 for placement of the mouse or glide point or the like and a bottom side provided with a plurality of mounting holes 52 at its front and rear edges for locking with the slide rail means 6. The sliding mouse pad 5 further has a projecting border 53 at the outermost end thereof to facilitate pulling of the sliding mouse pad 5 from the keyboard slide 1.

The slide rail means 6 consists of two fixed rails 61 and two slide rails 62. The fixed rails 61 are substantially L-shaped plates and are fastened to the bottom side of the keyboard slide 1 such that they face opposite directions and locked to the hollow posts 19 at the front and rear edges of the bottom side of the keyboard slide 1 at the right or left side of the keyboard slide 1. Each fixed rail 61 has a vertical section 611 provided with a horizontal slide slot 612 so that the slide rails 62 may displace between the slide slots 612 of the fixed rails 61. Each slide slot 612 has two holes 613 disposed respectively at its ends for receiving two stop pieces 63 respectively for restricting the displacement of the slide rails 62.

The slide rails 62 are substantially L-shaped plates as well. They are locked to the mounting holes 52 on the bottom side of the sliding mouse pad 5 such that they are located at the front and the rear edges of the sliding mouse pad 5. A horizontal section of each slide rail 62 has two or more than two projections 621 extending therefrom for fitting into a plurality of rollers 64 of corresponding size. Each roller 64 has a flange 641 of a larger size so that the flange 641 abuts the inner rim of the slide slot 612 when the rollers 64 are placed in the respective slide slots 612 and will not slip off the slide slots 612. By means of the above-described arrangement, the mouse side 5 may be retractably pulled outwardly or pushed inwardly under the keyboard slide 1.

The above-mentioned stop pieces 63 are made of elastic material and are provided with at least one raised portion 631 at an inner edge thereof. A stop portion 632 is disposed at an outer edge thereof such that the distance between the raised portion 631 and the stop portion 632 is equivalent to the thickness of the fixed rails 61. The stop portion 632 has a stop end 634 and an oblique nose 633 formed at an inner side thereof and the nose 633 may fit smoothly into the hole 613 of the slide slot 612 so that the stop portions 632 may be easily slip off the fixed rails 62. When the roller 64 touches the stop portion 632, the stop portion 632 will be pressed downwardly so that the roller 64 may pass over the stop end 634 to fit into the slide slot 612. Thereafter, the stop portion 632 will reset to its original position with its stop end 634 urging against the roller 64 for positioning purposes.

Advantages of employing the present invention may be summarized as follows:

1. The configuration of the keyboard slide 1 of the present invention may be selectively used with a multimedia keyboard or a standard keyboard after the palm rest 2 of the invention is secured in place. In addition the raised portions 14 and the adjusting element 4 allows the keyboard placed on the keyboard slide 1 to be properly positioned.
2. The keyboard slide 1 may be used in conjunction with conventional slide rail devices or retractable devices, and the side plates 3 may cover up the indentations 13 to enhance the appearance of the keyboard slide 1.
3. The arrangement of the depression 18 and the recess 23 provides space for the user to store small items.
4. A sliding mouse pad 5 may be retractably connected to the keyboard slide 1 for placement of the mouse, digitizer, glide-point or the like.
5. The sliding mouse pad 5 may be arranged at either the left or the right side of the keyboard slide 1.

Although the present invention has been illustrated and described with reference to the preferred embodiment thereof, it should be understood that it is in no way limited to the details of such embodiment but is capable of numerous modifications within the scope of the appended claims.

What is claimed is:

1. A keyboard supporting slide structure with a removable palm rest, comprising;
   a keyboard slide having a top side provided with a plurality of holes at a front edge thereof; a palm rest removably mounted on said keyboard slide, said palm rest having a plurality of snap hooks respectively hooked in the plurality of holes of said keyboard slide, and a curved surface for receiving the palms of a user; and, an adjusting means movably mounted on said keyboard slide, the adjusting means having a stop piece extending above the top side of the keyboard slide and mounted such that a distance between the stop piece and the front edge of the keyboard slide is adjustable, said keyboard slide further comprising two indentations respectively disposed at lateral sides of the keyboard slide, each of said two indentations being provided with a plurality of locking holes for locking with a slide rail means.

2. The keyboard supporting slide structure as claimed in claim 1, wherein said two indentations are each provided with a plurality of fastening slots, and further comprising two side plates, each having a size corresponding to that of one of said two indentations and having a plurality of lugs configured to fit into said fastening slots to attach the side plates to the keyboard slide in the indentations.

3. The keyboard supporting slide structure as claimed in claim 1, wherein said keyboard slide further comprises raised portions respectively disposed at each to two lateral sides for limiting lateral displacement of a keyboard placed on said keyboard slide.

4. The keyboard support slide structure as claimed in claim 1, wherein the adjusting means comprises: an adjusting hole having a front portion formed at a central rear portion of said keyboard slide; an adjusting element having the stop piece, the adjusting element movably located in the adjusting hole; two parallel lateral flanges on the keyboard slide located adjacent to the adjusting hole; a plurality of corrugated teeth formed adjacent to the front portion of the adjusting hole such that said teeth extend perpendicularly to said lateral flanges; said adjusting element further comprising at least two snap hooks extending from a bottom edge thereof and engaging said lateral flanges, and a raised portion at a front end thereof engaging said teeth adjacent to said adjusting hole.

5. The keyboard supporting slide structure as claimed in claim 1, further comprising a depression located adjacent to front edge of said keyboard slide for placement of small items therein.

6. The keyboard supporting slide structure as claimed in claim 5, further comprising a recess in said palm rest in alignment with the depression in said keyboard slide for placement of small items.

7. The keyboard supporting slide structure as claimed in claim 6, further comprising a cover pivotally connected to said palm rest over said recess so that said cover may be opened and closed.

8. The keyboard supporting slide structure as claimed in claim 1, wherein said keyboard slide further comprises a plurality of equally spaced apart horizontal surface ribs for increasing friction between said keyboard slide and a keyboard.

9. The keyboard supporting slide structure as claimed in claim 1, wherein said keyboard slide further comprises a bottom side provided with a plurality of symmetrical hollow screw posts for attachment to retractable rod devices.

10. The keyboard supporting slide structure as claimed in claim 1, further comprising a soft pad affixed to said curved surface of said palm rest to provide comfort.

11. A slide rail means movably connecting a first object and a second object, said slide rail means comprising: two fixed rails and two slide rails, wherein said fixed rails each are substantially L-shaped and are attached to the first object such that said L-shaped fixed rails face in opposite directions, each of said fixed rails having a first vertical section with an elongated horizontal slide slot, a mounting hole at either end of the vertical section adjacent to the elongated slide slot, wherein each of said slide rails are substantially L-shaped and are secured to the second object, each of said slide rails having a second vertical section provided with at least two projections, each projection supporting a roller, said rollers engaging the elongated slide slots of said first vertical sections such that said fixed rails and said slide rails will not be separated from one another and the first and second objects may move relative to each other; and stop pieces fixed to the mounting holes of the first vertical sections, the stop pieces having a stop portion to contact one of the rollers so as to limit the displacement of the slide rails relative to the fixed rails.

12. The slide rail means as claimed in claim 11, wherein the first object comprises a keyboard slide having a bottom side which is provided with a plurality of second mounting holes at front and rear edges to enable connection with said fixed rails.

13. The slide rail means as claimed in claim 11, wherein the second object is a sliding mouse pad having an upper surface and a bottom side provided with a plurality of third mounting holes to enable connection of said slide rails, said sliding mouse pad further having a projected border at an outermost end thereof to facilitate pulling or pushing.

14. The slide rail means as claimed in claim 11, wherein each of said stop pieces comprises an elastic material and has at least one raised portion provided at one end thereof and a vertical stop portion at another end thereof, the distance between said raised portion and said stop portion being equivalent to the thickness of said first vertical section of said fixed rails, said stop portion having a projecting stop end with an oblique nose formed at one side thereof to facilitate insertion of said projecting stop into one of said mounting holes in the first vertical section, whereby, when said roller is to be inserted into said elongated slide slot, said roller will press said stop portion and pass over said stop end into said slide slot, and when said roller has engaged said elongated slide slot, said stop portion will return to its original position whereby contact with said roller limits the movement of said roller in said elongated slide slot.

15. A keyboard supporting slide structure with a removable palm rest, comprising:
a keyboard slide having a top side provided with a plurality of holes at a front edge thereof; a palm rest removably mounted on said keyboard slide, said palm rest having a plurality of snap hooks respectively hooked in the plurality of holes of said keyboard slide, and a curved surface for receiving the palms of a user; and, an adjusting means movably mounted on said keyboard slide, the adjusting means having a stop piece extending above the top side of the keyboard slide and mounted such that a distance between the stop piece and the front edge of the keyboard slide is adjustable, wherein the adjusting means comprises: an adjusting hole having a front portion formed at a central rear portion of said keyboard slide; an adjusting element having the stop piece, the adjusting element movably located in the adjusting hole; two parallel lateral flanges on the keyboard slide located adjacent to the adjusting hole; a plurality of corrugated teeth formed adjacent to the front portion of the adjusting hole such that said teeth extend perpendicularly to said lateral flanges; said adjusting element further comprising at least two snap hooks extending from a bottom edge thereof and engaging said lateral flanges.

16. A keyboard supporting slide structure with a removable palm rest, comprising:
a keyboard slide having a top side provided with a plurality of holes at a front edge thereof; a palm rest removably mounted on said keyboard slide, said palm rest having a plurality of snap hooks respectively hooked in the plurality of holes of said keyboard slide, and a curved surface for receiving the palms of a user; and, an adjusting means movably mounted on said keyboard slide, the adjusting means having a stop piece extending above the top side of the keyboard slide and mounted such that a distance between the stop piece and the front edge of the keyboard slide is adjustable, wherein said keyboard slide further comprises a bottom side provided with a plurality of symmetrical hollow screw posts for attachment to retractable rod devices.

17. A keyboard supporting slide structure with a removable palm rest, comprising:
a keyboard slide having a top side provided with a plurality of holes at a front edge thereof; a palm rest removably mounted on said keyboard slide, said palm rest having a plurality of snap hooks respectively hooked in the plurality of holes of said keyboard slide, and a curved surface for receiving the palms of a user; and, an adjusting means movably mounted on said keyboard slide, the adjusting means having a stop piece extending above the top side of the keyboard slide and mounted such that a distance between the stop piece and the front edge of the keyboard slide is adjustable; a depression located adjacent to the front edge of said keyboard slide for placement of small items therein; and, a recess in said palm rest in alignment with the depression in said keyboard slide for placement of small items.

18. The keyboard supporting slide structure as claimed in claim 17, further comprising a cover pivotally connected to said palm rest over said recess so that said cover may be opened and closed.

* * * * *